United States Patent
Kong et al.

(10) Patent No.: US 11,075,759 B2
(45) Date of Patent: Jul. 27, 2021

(54) FINGERPRINT DATA PROCESSING METHOD AND PROCESSING APPARATUS

(71) Applicant: SHENZHEN GOODIX TECHNOLOGY CO., LTD., Guangdong (CN)

(72) Inventors: Weiguo Kong, Guangdong (CN); Bing Wang, Guangdong (CN); Wenbin Sun, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 280 days.

(21) Appl. No.: 16/170,654

(22) Filed: Oct. 25, 2018

(65) Prior Publication Data
US 2019/0068376 A1    Feb. 28, 2019

Related U.S. Application Data

(63) Continuation of application No. PCT/CN2017/072711, filed on Jan. 25, 2017.

(51) Int. Cl.
*H04L 9/32*    (2006.01)
*G06K 9/00*    (2006.01)
(Continued)

(52) U.S. Cl.
CPC ........ *H04L 9/3231* (2013.01); *G06K 9/00006* (2013.01); *G06K 9/00013* (2013.01);
(Continued)

(58) Field of Classification Search
CPC ....... H04L 9/3231; H04L 9/0844; H04L 9/16; H04L 9/3215; H04L 9/3245;
(Continued)

(56) References Cited

U.S. PATENT DOCUMENTS 7,184,579 B2    2/2007    Mizoguchi
7,813,822 B1 *  10/2010   Hoffberg .......... H04N 21/44222
                                                    700/94
(Continued)

FOREIGN PATENT DOCUMENTS

CN    1841993 A       10/2006
CN    102710613 A     10/2012
(Continued)

OTHER PUBLICATIONS

Credential Wrapping: From Anonymous Password Authentication to Anonymous Biometric Authentication Yanjiang Yang, Haibing Lu, Joseph K. Liu, Jian Weng, Youcheng Zhang, Jianying Zhou Asia CCS'16: Proceedings of the 11th ACM on Asia Conference on Computerand Communications Security. May 2016, pp. 141-151 (Year: 2016).*

(Continued)

*Primary Examiner* — Samson B Lemma
*Assistant Examiner* — Mohammad S Shams
(74) *Attorney, Agent, or Firm* — Heslin Rothenberg Farley & Mesiti P.C.

(57) ABSTRACT

Embodiments of the present disclosure relate to data processing technologies, and disclose a fingerprint data processing method and a processing apparatus. In some embodiments, the fingerprint data processing method includes: receiving a first ciphertext that carries fingerprint data; decrypting the first ciphertext to obtain the fingerprint data; identifying the fingerprint data and generating an identification result; encrypting the identification result and generating a second ciphertext that carries the identification result; and sending the second ciphertext. Some embodiments of the present disclosure further provide a fingerprint data processing apparatus. With some embodiments of the present disclosure, the fingerprint data can be transmitted in (Continued)

a ciphertext form, thereby ensuring the confidentiality of the fingerprint data, and improving the security of the fingerprint data.

14 Claims, 8 Drawing Sheets

(51) Int. Cl.
*H04L 9/16* (2006.01)
*H04L 9/08* (2006.01)
*H04L 29/06* (2006.01)

(52) U.S. Cl.
CPC ........ *G06K 9/00087* (2013.01); *H04L 9/0844* (2013.01); *H04L 9/16* (2013.01); *H04L 9/3215* (2013.01); *H04L 9/3242* (2013.01); *H04L 63/0428* (2013.01); *H04L 63/083* (2013.01); *H04L 63/12* (2013.01)

(58) Field of Classification Search
CPC ... H04L 63/0428; H04L 63/083; H04L 63/12; G06K 9/00006; G06K 9/00013; G06K 9/00089
USPC .......................................................... 713/181
See application file for complete search history.

(56) References Cited

U.S. PATENT DOCUMENTS

| | | | | |
|---|---|---|---|---|
| 8,316,237 | B1* | 11/2012 | Felsher | H04L 9/0825 713/171 |
| 9,300,639 | B1* | 3/2016 | Roth | H04L 9/08 |
| 9,619,804 | B1* | 4/2017 | Thatte | H04L 9/3231 |
| 9,935,948 | B2* | 4/2018 | Schultz | H04L 63/0861 |
| 2001/0025342 | A1 | 9/2001 | Uchida | |
| 2004/0266533 | A1* | 12/2004 | Gentles | G06F 21/34 463/42 |
| 2005/0195975 | A1* | 9/2005 | Kawakita | H04L 9/0825 380/30 |
| 2007/0038867 | A1* | 2/2007 | Verbauwhede | H04L 9/3242 713/186 |
| 2007/0039046 | A1* | 2/2007 | Van Dijk | H04L 9/3278 726/22 |
| 2008/0263363 | A1* | 10/2008 | Jueneman | H04L 63/061 713/184 |
| 2009/0083839 | A1 | 3/2009 | Shih | |
| 2009/0100269 | A1* | 4/2009 | Naccache | H04L 63/0861 713/186 |
| 2009/0305673 | A1* | 12/2009 | Mardikar | H04L 9/3249 455/411 |
| 2010/0119061 | A1* | 5/2010 | Kawale | H04L 9/0866 380/44 |
| 2010/0205431 | A1* | 8/2010 | Griffin | G06F 21/32 713/158 |
| 2010/0205452 | A1* | 8/2010 | Griffin | H04L 9/3231 713/186 |
| 2011/0068893 | A1 | 3/2011 | Lahiri | |
| 2012/0131354 | A1* | 5/2012 | French | H04L 9/3271 713/189 |
| 2016/0188307 | A1* | 6/2016 | Reagan | H04L 67/34 717/177 |
| 2016/0373417 | A1* | 12/2016 | Mandal | H04L 9/0844 |
| 2017/0141920 | A1* | 5/2017 | Herder, III | G06F 21/575 |
| 2017/0171219 | A1* | 6/2017 | Campagna | H04L 9/0841 |
| 2017/0344407 | A1* | 11/2017 | Jeon | H04L 9/3297 |
| 2018/0167220 | A1* | 6/2018 | Levy | H04L 9/3247 |

FOREIGN PATENT DOCUMENTS

| | | | |
|---|---|---|---|
| CN | 102750513 A | 10/2012 | |
| CN | 103646202 A | 3/2014 | |
| CN | 105207776 A | 6/2014 | |
| CN | 104408356 A | 11/2014 | |
| CN | 105207776 | * 12/2015 | ............. H04L 29/32 |
| CN | 105391554 A | 3/2016 | |
| CN | 105678226 A | 6/2016 | |
| CN | 106130729 A | 6/2016 | |

OTHER PUBLICATIONS

A conceptual framework for testing biometric algorithms within operating systems' authentication Arslan Bromme, Marcel Kronberg, Oliver Ellenbeck, Oliver Kasch SAC '02: Proceedings of the 2002 ACM symposium on Applied computing. Mar. 2002, pp. 273-280 (Year: 2002).*

Improving multi-tier security using redundant authentication Jodi P. Boyer, Ragib Hasan, Lars E. Olson, Nikita Borisov, Carl A. Gunter, David Raila CSAW'07: Proceedings of the 2007 ACM workshop on Computer security architecture. Nov. 2007, pp. 54-62 (Year: 2007).*

Chinese Search Report, dated Sep. 3, 2019.

Supplemental European Search Report issued by the European Patent Office for European Patent Application No. 17894189.4 dated Apr. 1, 2019.

Indian Examination Report for Indian Application No. 201817040276 dated May 12, 2020.

Examination Report for Chinese Patent Application No. 201780000038.0 dated Dec. 3, 2020.

* cited by examiner

FINGERPRINT DATA PROCESSING METHOD AND PROCESSING APPARATUS

CROSS REFERENCE TO RELATED APPLICATIONS

This disclosure is a continuation of international application number PCT/CN2017/072711, filed on Jan. 25, 2017, which is incorporated into this disclosure by reference in its entirety.

TECHNICAL FIELD

Embodiments of the present disclosure relate to data processing technologies, and in particular, to a fingerprint data processing method and a processing apparatus.

BACKGROUND

A fingerprint identification system is widely applied to electronic devices. Generally, the fingerprint identification system may be simply divided into a solution of performing fingerprint matching on a host (MOH) and a solution of performing fingerprint matching on a fingerprint sensor chip (MOC). In the solution of performing fingerprint matching on a host (MOH), when the system is applied to an electronic device, the security is always one of the problems concerned by people.

At present, in the solution of performing fingerprint matching on a host (MOH), in a fingerprint processing (i.e., fingerprint registration or fingerprint matching) process, first, a fingerprint sensor collects fingerprint data, then, the fingerprint sensor transmits the collected fingerprint data directly to a host by using a data bus, actually to a running environment of the host (X86 or X64), and a fingerprint algorithm processing program of the host processes the received fingerprint data. If it is a fingerprint registration process, a fingerprint template is stored or updated; and if it is a fingerprint matching process, a matching result is returned to a corresponding application program.

However, when the existing solution of performing fingerprint matching on a host (MOH) is applied to an electronic device, except that the security of an execution environment of the fingerprint algorithm processing program running in the host is relatively low because the running environment of the host is easily to be attacked, a data transmission process mainly includes the following two security concerns:

Firstly, transmission data transmitted to the host from the fingerprint sensor is easily recorded and replayed.

Secondly, no security protection is performed on a returning process of a matching result of the host, and the returning process is easily tampered or replayed and attacked.

That is, in the existing solutions, no special security process is performed during the transmission process of fingerprint data, the fingerprint data is basically transmitted in a plaintext form, and the confidentiality of the fingerprint data of users cannot be ensured. Therefore, the fingerprint data are easily attacked in links of the transmission process, and comprehensive and multi-directional security protection cannot be achieved.

SUMMARY

An object of some embodiments of the present disclosure is to provide a fingerprint data processing method and a processing apparatus, so that fingerprint data can be transmitted in a ciphertext form, thereby ensuring the confidentiality of the fingerprint data, and so that the fingerprint data is processed in a trusted execution environment, thereby improving the security of the fingerprint data.

An embodiment of the present disclosure provides a fingerprint data processing method, including: receiving a first ciphertext that carries fingerprint data; decrypting the first ciphertext, to obtain the fingerprint data; identifying the fingerprint data, and generating an identification result; encrypting the identification result, and generating a second ciphertext that carries the identification result; and sending the second ciphertext.

An embodiment of the present disclosure further provides a fingerprint data processing apparatus, including: a data receiving module, configured to receive a first ciphertext that carries fingerprint data; a data decryption module, configured to decrypt the first ciphertext, to obtain the fingerprint data; a data identification module, configured to identify the fingerprint data, and generate an identification result; a data encryption module, configured to encrypt the identification result, and generate a second ciphertext that carries the identification result; and a data sending module, configured to send the second ciphertext.

Compared with the existing technologies, in the embodiments of the present disclosure, a first ciphertext that carries fingerprint data is received, that is, the fingerprint data is transmitted in a ciphertext form from a sender to a receiver, thereby effectively avoiding a situation in which the fingerprint data may be recorded or replayed. An identification result is encrypted, and a second ciphertext that carries the identification result is generated, that is, the first ciphertext is processed by the receiver and the identification result is encrypted at the receiver, and then leaves the receiver in a second ciphertext form, so that the identification result is transmitted in a ciphertext form from the receiver of the first ciphertext to a receiver of the second ciphertext, and security protection is performed on a returning process of the identification result, thereby effectively avoiding a situation in which the identification result may be attacked in a transmission process. In general, in the embodiments of the present disclosure, the fingerprint data obtains multi-directional security protection, thereby ensuring the confidentiality of the fingerprint data, and improving the security of the fingerprint data.

In addition, the decrypting the first ciphertext, to obtain the fingerprint data specifically includes: decrypting the first ciphertext by using a first decryption algorithm, to obtain the fingerprint data and a first message authentication code corresponding to the fingerprint data; and generating a second message authentication code corresponding to the fingerprint data by using a message authentication code algorithm; when determining that the first message authentication code is matched with the second message authentication code, determining that the obtained fingerprint data is effective. The first ciphertext is obtained after the fingerprint data and the first message authentication code are encrypted by using a first encryption algorithm. The first decryption algorithm matches with the first encryption algorithm. In the embodiment, a sender of the first ciphertext encrypts the fingerprint data, and transmits the encrypted fingerprint data to a receiver of the first ciphertext, and a second message authentication code is generated by using the message authentication code algorithm, thereby ensuring the complexity and reality of the fingerprint data.

In addition, parameters of the message authentication code algorithm include the fingerprint data and a first session key. Before receiving a first ciphertext that carries fingerprint data, the method further includes: generating the first session key according to a preset shared key; establishing a first session channel to a sender of the first ciphertext according to the first session key, where the first session channel is used in transmission of the first ciphertext. In the embodiments, the first session key is generated according to a preset shared key, and compared with a manner in the existing technology that a first session key is generated according to a shared key generated in real time, the preset shared key helps to reduce performance requirements on the sender of the first ciphertext (for example, a fingerprint sensor), so that a sender with lower performance can also be applied to the embodiments, thereby increasing the application scope of this embodiment.

In addition, a preset manner of the shared key is factory presetting. In the embodiments, a preset manner of the shared key is provided. By using a factory preset manner, a host and the sender of the first ciphertext of each electronic device have a confidential shared key separately, so that the host and the sender implement a one-to-one binding relationship. After the shared key is written successfully, the shared key in a memory is immediately destroyed, to allow read-write protection.

In addition, before identifying the fingerprint data and generating an identification result, the method further includes: obtaining a third ciphertext that carries a fingerprint template; and decrypting the third ciphertext, to obtain the fingerprint template. The step of identifying the fingerprint data and generating an identification result is specifically: performing matching identification on the fingerprint data and the fingerprint template, and generating the identification result. In the embodiments, the fingerprint template is actually stored (stored in a preset storage area) in a third ciphertext form and transmitted in the third ciphertext form to the receiver of the first ciphertext. That is, the fingerprint template is transmitted in a ciphertext form, thereby further improving the security of the fingerprint data.

In addition, the parameters of the message authentication code algorithm further include a count value of a built-in counter. In the embodiments, a count value of a built-in counter is added as a parameter to the message authentication code algorithm, to effectively resist a replay attack.

BRIEF DESCRIPTION OF THE DRAWINGS

One or more embodiments provide exemplary descriptions by using the figures in the corresponding accompanying drawings. These exemplary descriptions do not constitute limitations to the embodiments. Elements with same reference numbers in the accompanying drawings represent similar elements. Unless specifically stated, the figures in the accompanying drawings do not constitute proportion limitations.

DETAILED DESCRIPTION

To make the objectives, technical solutions, and advantages of the present disclosure clearer, the following describes embodiments of the present disclosure in detail with reference to the accompanying drawings. However, a person of ordinary skill in the art may understand that, in the embodiments of the present disclosure, to make readers better understand this application, many technical details are provided. However, the technical solutions required to be protected by this application can also be implemented without these technical details and variations and modifications based on the following embodiments.

Figure 1:
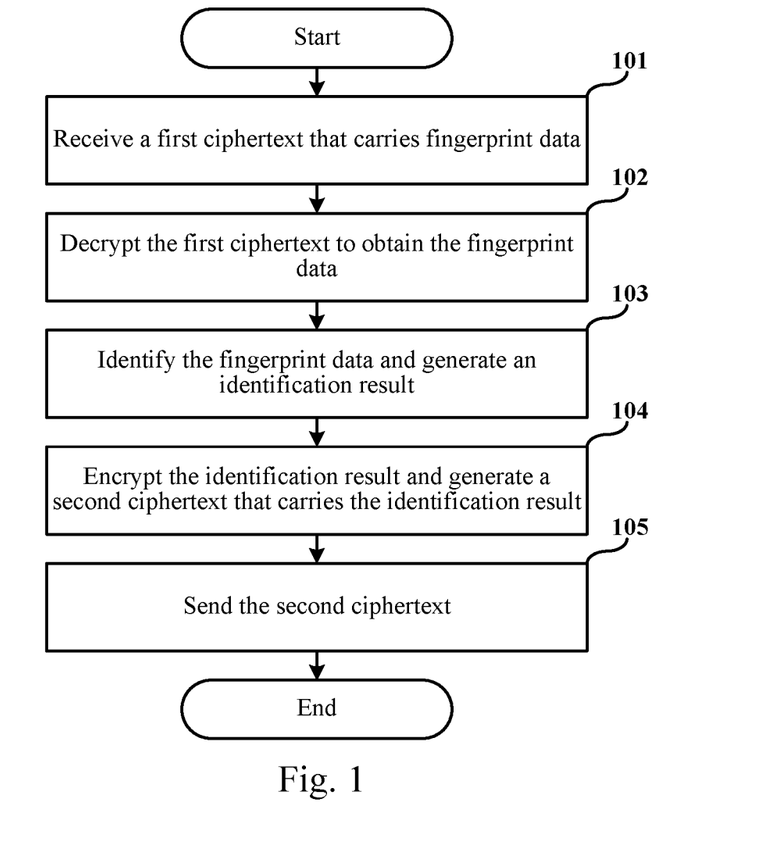
FIG. 1 is a specific flowchart of a fingerprint data processing method according to a first embodiment.

A first embodiment of the present disclosure relates to a fingerprint data processing method, applied to an electronic device. As shown in FIG. 1, a specific process of this embodiment includes steps as below.

Step 101. Receive a first ciphertext that carries fingerprint data.

In this embodiment, the first ciphertext that carries fingerprint data and that is sent by a fingerprint sensor of an electronic device may be received, but this is not limited in practice. A first ciphertext that carries fingerprint data and that is sent by another sender may also be received.

In this embodiment, the first ciphertext that carries fingerprint data is obtained by encrypting fingerprint data in a plaintext form. In this embodiment, a corresponding plaintext may be encrypted by using an encryption algorithm to obtain a first ciphertext. The used encryption algorithm is, for example, an advanced encryption standard (AES) algorithm. However, this embodiment does not constitute any limitation to the specific type of the encryption algorithm. For example, the encryption algorithm may also be a data encryption standard (DES) algorithm.

In this embodiment, a receiver of the first ciphertext runs in a trusted execution environment (TEE), so that the receiver can obtain hardware protection of the TEE, and therefore, a malicious program cannot destroy or tamper the execution environment of the receiver. In this embodiment, the receiver of the first ciphertext may be, for example, a fingerprint algorithm processing program of a host, but this is not limited.

Step 102. Decrypt the first ciphertext to obtain the fingerprint data.

This embodiment does not constitute any limitation to the decryption manner of the first ciphertext.

Step 103. Identify the fingerprint data and generate an identification result.

Step 104. Encrypt the identification result and generate a second ciphertext that carries the identification result.

In this embodiment, the identification result may be encrypted by using an encryption algorithm, which may be the same as or different from the encryption algorithm of the first ciphertext. This is not limited in this embodiment.

Step 105. Send the second ciphertext.

In this embodiment, the second ciphertext is sent to a corresponding application proxy or application program.

The application proxy works in the TEE, and can obtain hardware protection of the TEE.

Compared with the existing technologies, in this embodiment of the present disclosure, the receiver of the first ciphertext works in the TEE, so that the receiver can obtain hardware protection of the TEE, and therefore, a malicious program cannot destroy or tamper the execution environment of the receiver. In this embodiment, a first ciphertext that carries fingerprint data is received, that is, the fingerprint data is transmitted in a ciphertext form from a sender to a receiver, thereby effectively avoiding a situation in which the fingerprint data may be recorded or replayed. An identification result is encrypted, and a second ciphertext that carries the identification result is generated, that is, after the first ciphertext is processed by the receiver, the identification result is encrypted at the receiver and then leaves the receiver in a second ciphertext form, so that the identification result is transmitted in a ciphertext form from the receiver of the first ciphertext to a receiver of the second ciphertext, and security protection is performed on a returning process of the identification result, thereby effectively avoiding a situation in which the identification result may be attacked in a transmission process. In general, in this embodiment of the present disclosure, the fingerprint data obtains multi-directional security protection, thereby ensuring the confidentiality and unreplayability of the fingerprint data, and improving the security of fingerprint data.

The step divisions of the foregoing various methods are merely for ease of clear description, and may be combined into one step during implementation or some steps may be split into multiple steps. This falls within the protection scope of this patent provided that a same logical relationship is included. A core design in which irrelevant modifications are added or irrelevant designs are introduced to an algorithm or a process, but does not change the algorithm and the process shall fall within the protection scope of the patent.

A second embodiment of the present disclosure relates to a fingerprint data processing method. The second embodiment is detailing based on the first embodiment, and the main detailing is: in the second embodiment of the present disclosure, obtaining fingerprint data in a plaintext form from a first ciphertext.

Figure 2:
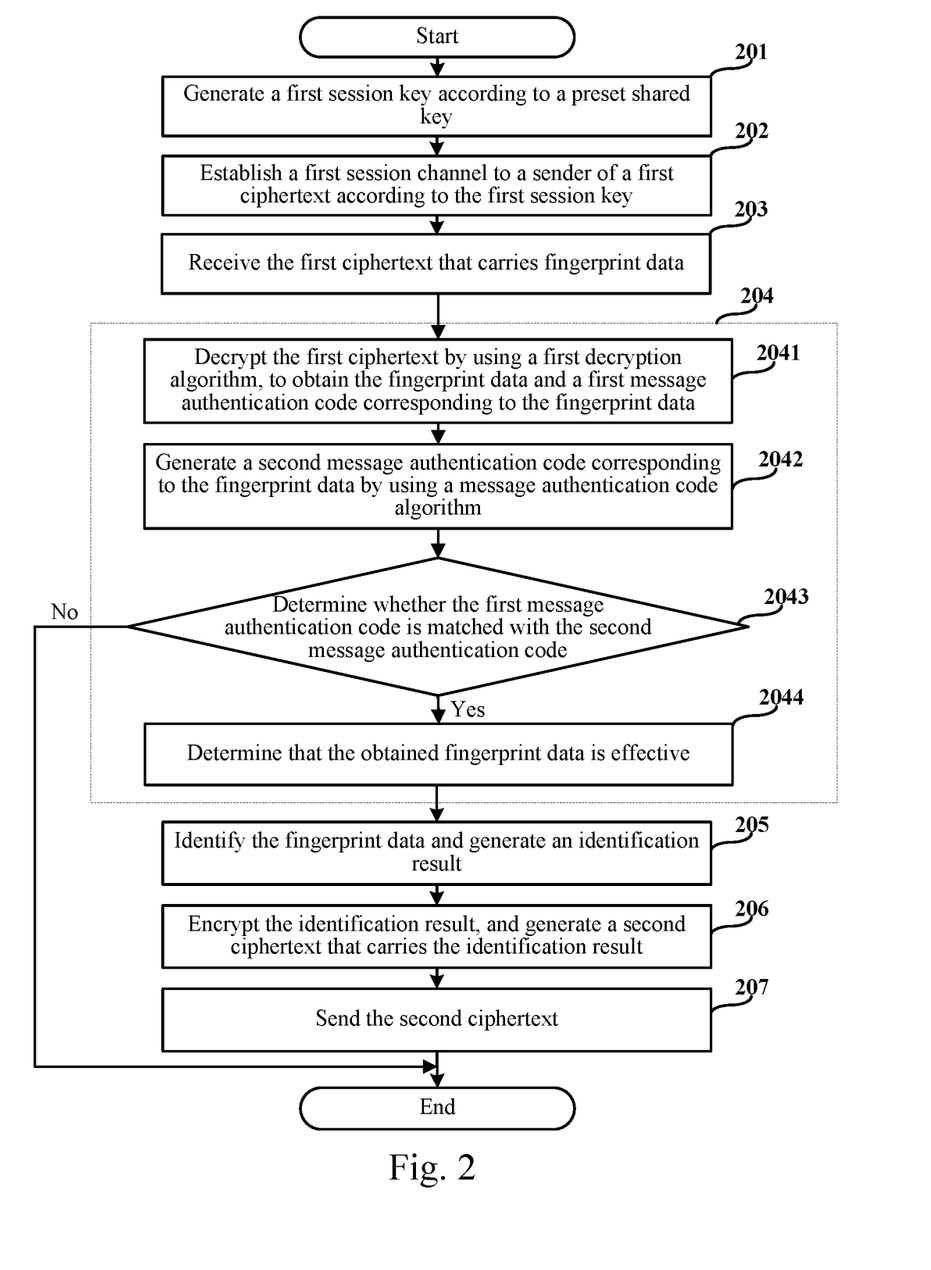
FIG. 2 is a specific flowchart of a fingerprint data processing method according to a second embodiment.

The flowchart of the fingerprint data processing method in this embodiment is shown in FIG. 2. Step 203, and steps 205 to 207 are correspondingly the same as step 101, and steps 103 to 105 in the first embodiment. This is not described again in this embodiment, and the difference is: Steps 201 and 202 are added to this embodiment, and step 204 is detailed. Specific descriptions are as follows:

Step 201. Generate a first session key according to a preset shared key.

In this embodiment, because a sender (for example, a fingerprint sensor) of a first ciphertext is an element independent of a host (main control chip), generally, a processing capability of the sender is relatively weak, and a preset shared key is used. Compared with the manner of generating a first session key according to a shared key generated in real time in existing art, the preset shared key reduces performance requirements on the sender (for example, the fingerprint sensor) of the first ciphertext, so that a sender with lower performance can also be applied to this embodiment, thereby increasing the application scope of this embodiment.

In this embodiment, a factory preset manner is used to preset the shared key. Specifically, in a factory production phase, a production line tool may generate a confidential shared key randomly for a host and a fingerprint sensor of an electronic device, and store the shared key to the host and the fingerprint sensor of the electronic device, so that the host and the sender implement a one-to-one binding relationship. After the shared key is written successfully, the production line tool immediately destroys the shared key in the memory, so that the host and the sender allow read-write protection. However, this embodiment does not constitute any limitation to the preset manner of the shared key.

In this embodiment, a first session key may be generated according to the preset shared key and a random number generated by both sides, and different sessions generate different first session keys. Specifically, the host and the fingerprint sensor execute a handshake protocol of a security protocol. The host and the fingerprint sensor separately generate a random number, and send the generated random number to the other side. The host and the fingerprint sensor separately generate a first session key according to the preset shared key and the random numbers generated by both sides. However, this embodiment does not constitute any limitation to the generation manner of the first session key. Exemplarily, the shared key is a PMK, the host and the fingerprint sensor execute a handshake protocol of a security protocol, the host generates a random number A, and the fingerprint sensor generates a random number B. The host sends the generated random number A to the fingerprint sensor, the fingerprint sensor sends the generated random number B to the host. The host generates a first session key according to the shared key PMK and the random numbers A and B of both sides; and the fingerprint sensor generates a first session key according to the shared key PMK and the random numbers A and B of both sides. However, this is only an exemplary description herein, and this is not limited in practice.

In this embodiment, the security protocol may be a transport layer security (TLS), but this embodiment does not constitute any limitation to the type of the security protocol.

In this embodiment, because a host data receiving module runs in the TEE, a working environment of the security protocol of the host is also in the TEE, to obtain hardware protection.

Step 202. Establish a first session channel to the sender of the first ciphertext according to the first session key.

In this embodiment, the sender of the first ciphertext may be a fingerprint sensor of an electronic device, but this is not limited in this embodiment.

In this embodiment, the first session channel to the sender of the first ciphertext is established according to the first session key, so that the first session channel is under the protection of the security protocol.

In this embodiment, the first session channel is used in transmission of the first ciphertext, that is, the first session channel is a security transmission channel established for the first ciphertext.

In this embodiment, the first session key may be used to authenticate an identity of the other side, to ensure the authenticity of the identity of the other side, thereby establishing the first session channel. Specifically, in this embodiment, the host and the fingerprint sensor separately encrypt, by using the first session key, all data sent and received previously, to obtain a first identity ciphertext, and send the first identity ciphertext to the other side. Then, the host and the fingerprint sensor separately compare the received first identity ciphertext with their own first identity ciphertext. If the ciphertext data are the same, the identity authentications of both sides are successful, indicating that the first session channel is established successfully.

Step 204. Decrypt the first ciphertext to obtain the fingerprint data.

In this embodiment, step 204 includes substeps 2041 to 2044, which are specifically as follows:

Substep 2041. Decrypt the first ciphertext by using a first decryption algorithm, to obtain the fingerprint data and a first message authentication code corresponding to the fingerprint data.

Figure 3:
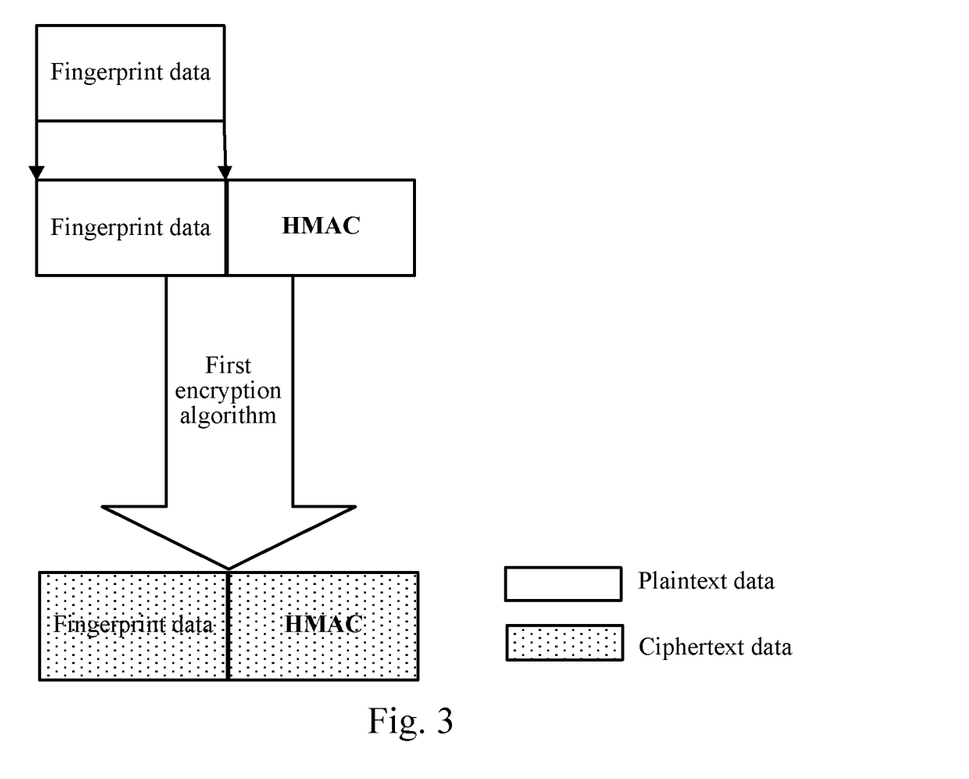
FIG. 3 is a schematic diagram of a generation process of a first ciphertext according to the second embodiment.

In this embodiment, at the sender of the first ciphertext, the first ciphertext is obtained after the fingerprint data and the first message authentication code are encrypted by using the first encryption algorithm. The first message authentication code may be a hash-based message authentication code (HMAC) (but this is not limited). Exemplarily, FIG. 3 shows an encryption process (that is, a generation process of the first ciphertext) of the fingerprint data and the first message authentication code. The first ciphertext is obtained after the fingerprint data and the first message authentication code (HMAC) are encrypted by using the first encryption algorithm. However, this is only an exemplary description herein, and this is not limited in practice.

Figure 4:
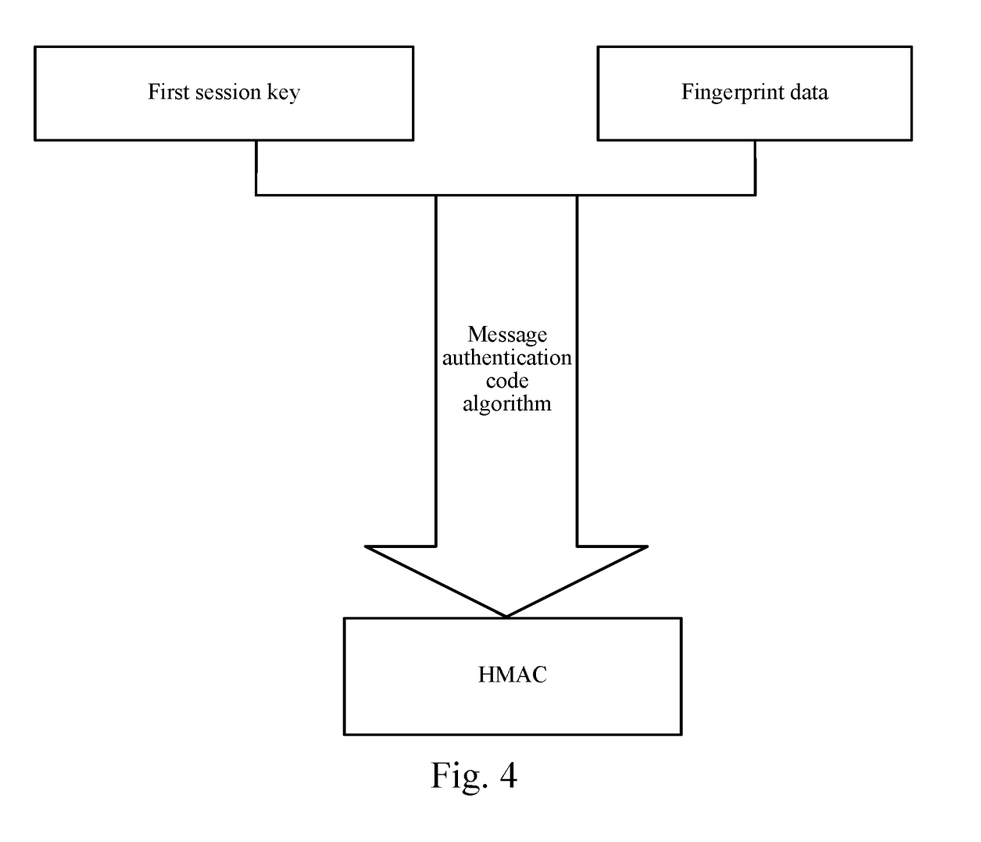
FIG. 4 is a schematic diagram of a generation process of a first message authentication code according to the second embodiment.

FIG. 4 shows the generation manner of the first message authentication code at the sender. By using a message authentication code algorithm, a second message authentication code is calculated according to the fingerprint data and the first session key.

In this embodiment, the decryption process of the first ciphertext is actually an inverse process of the encryption process, that is, the inverse process of the process shown in FIG. 3. This is not described again in this embodiment.

In this embodiment, the first decryption algorithm matches with the first encryption algorithm. For example, in this embodiment, when the first encryption algorithm is an AES algorithm, the first decryption algorithm is a decryption algorithm matched with the AES algorithm. But, the first encryption algorithm may be a DES algorithm or a triple data encryption standard (3DES) algorithm. This embodiment does not constitute any limitation to the type of the first encryption algorithm.

Substep 2042. Generate a second message authentication code corresponding to the fingerprint data by using a message authentication code algorithm.

In this embodiment, the second message authentication code is a hash message authentication code (HMAC), but this is not limited in practice.

In this embodiment, at the host, the generation manner of the second message authentication code is the same as the manner of the sender of the first ciphertext generating the second message authentication code. This is not described again.

In one example, the parameters of the message authentication code algorithm further include a count value of a built-in counter. That is, in the process of calculating the second message authentication code, a count value of a built-in counter at the fingerprint sensor is taken to effectively resist a replay attack.

Step 2043. Determine whether the first message authentication code is matched with the second message authentication code; if yes, enter substep 2044, otherwise, the step directly ends.

In this embodiment, the first message authentication code is compared with the second message authentication code to determine whether the first message authentication code is matched with the second message authentication code.

Step 2044. Determine that the obtained fingerprint data is effective.

In this embodiment, when the first message authentication code is matched with the second message authentication code, it is determined that the obtained fingerprint data is effective. It indicates that the received fingerprint data is complete and authentic.

Compared with the first embodiment, in this embodiment of the present disclosure, the security protocol is applied to the fingerprint data processing method. The first session key is generated according to the preset shared key, thereby reducing performance requirements on the sender of the first ciphertext. In this embodiment, the sender of the first ciphertext encrypts the fingerprint data, and transmits the fingerprint data to the receiver of the first ciphertext, thereby ensuring the confidentiality of the fingerprint data. The second message authentication code is generated by using the message authentication code algorithm, thereby ensuring the complexity and authenticity of the fingerprint data.

A third embodiment of the present disclosure relates to a fingerprint data processing method. The third embodiment is detailing based on the first embodiment, and the main detailing is: in the third embodiment of the present disclosure, a specific generation manner of an identification result is provided.

Figure 5:
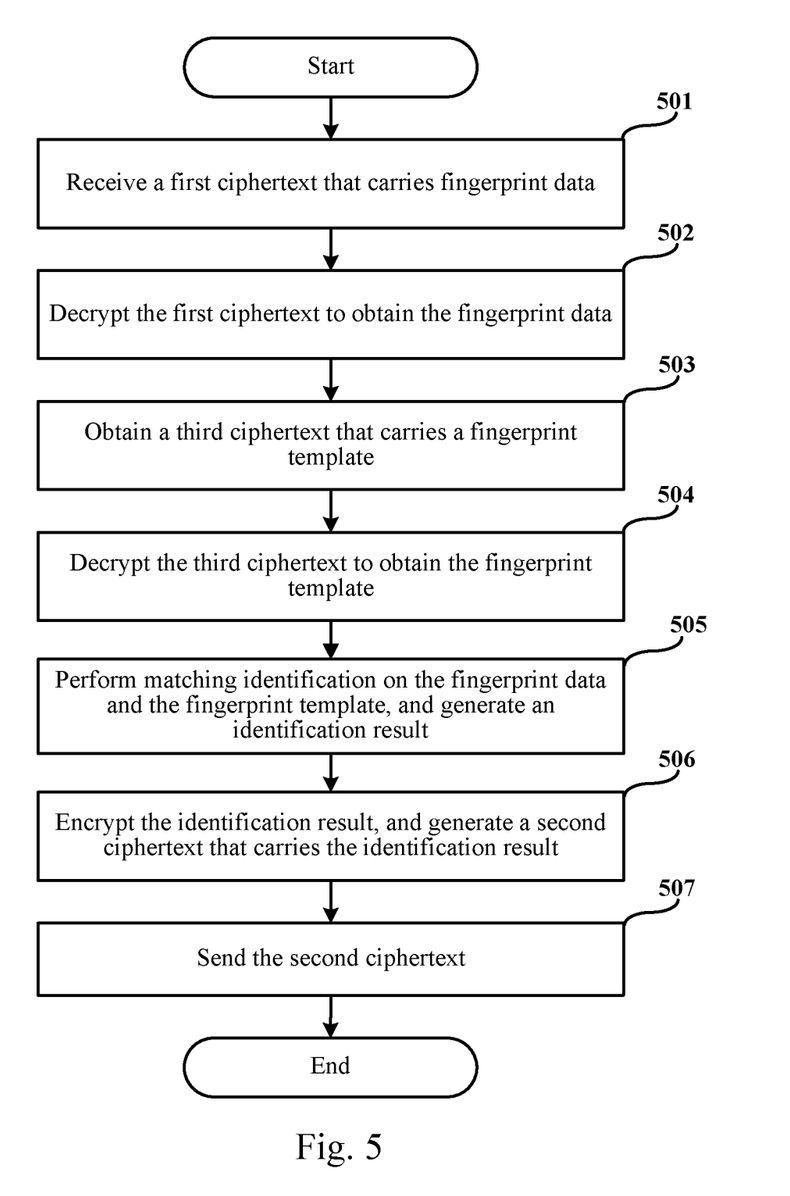
FIG. 5 is a specific flowchart of a fingerprint data processing method according to a third embodiment.

FIG. 5 shows the flowchart of the fingerprint data processing method in this embodiment. Steps 501 to 502 and steps 506 to 507 are correspondingly the same as steps 101 to 102 and steps 104 to 105 in the first embodiment. This is not described again in this embodiment, and the difference is: Steps 503, 504, and 505 are added to this embodiment. Specific descriptions are as follows:

Step 503. Obtain a third ciphertext that carries a fingerprint template.

In this embodiment, a storage area may be preset to store the third ciphertext. A user may perform fingerprint registration in advance, and a fingerprint template generated by the fingerprint registration is encrypted in a TEE, and finally is stored in the preset storage area in a third ciphertext form.

In this embodiment, a receiver of the first ciphertext may obtain the third ciphertext from the preset storage area.

Step 504. Decrypt the third ciphertext to obtain the fingerprint template.

In this embodiment, the third ciphertext may be decrypted by using a decryption algorithm, to obtain the fingerprint template. The decryption algorithm of the third ciphertext is matched with the encryption algorithm of the third ciphertext.

Step 505. Perform matching identification on the fingerprint data and the fingerprint template, and generate an identification result.

In practice, this step is a specific implementation manner of step 103 in the first embodiment.

In practice, this embodiment may also be a detailed solution based on the second embodiment.

Compared with the first embodiment, in this embodiment of the present disclosure, the fingerprint template is stored in the preset storage area in a third ciphertext form and is transmitted in the third ciphertext form to the receiver of the first ciphertext from the preset storage area, thereby ensuring the confidentiality of the fingerprint data. Moreover, matching identification is performed on the fingerprint data and the fingerprint template to generate an identification result, and a specific manner of generating the identification result is provided.

A fourth embodiment of the present disclosure relates to a fingerprint data processing method. The fourth embodiment is a further specified example based on the first embodiment, and the main specified part is that: in the fourth embodiment of the present disclosure, a specific implementation manner of generating the second ciphertext is provided.

Figure 6:
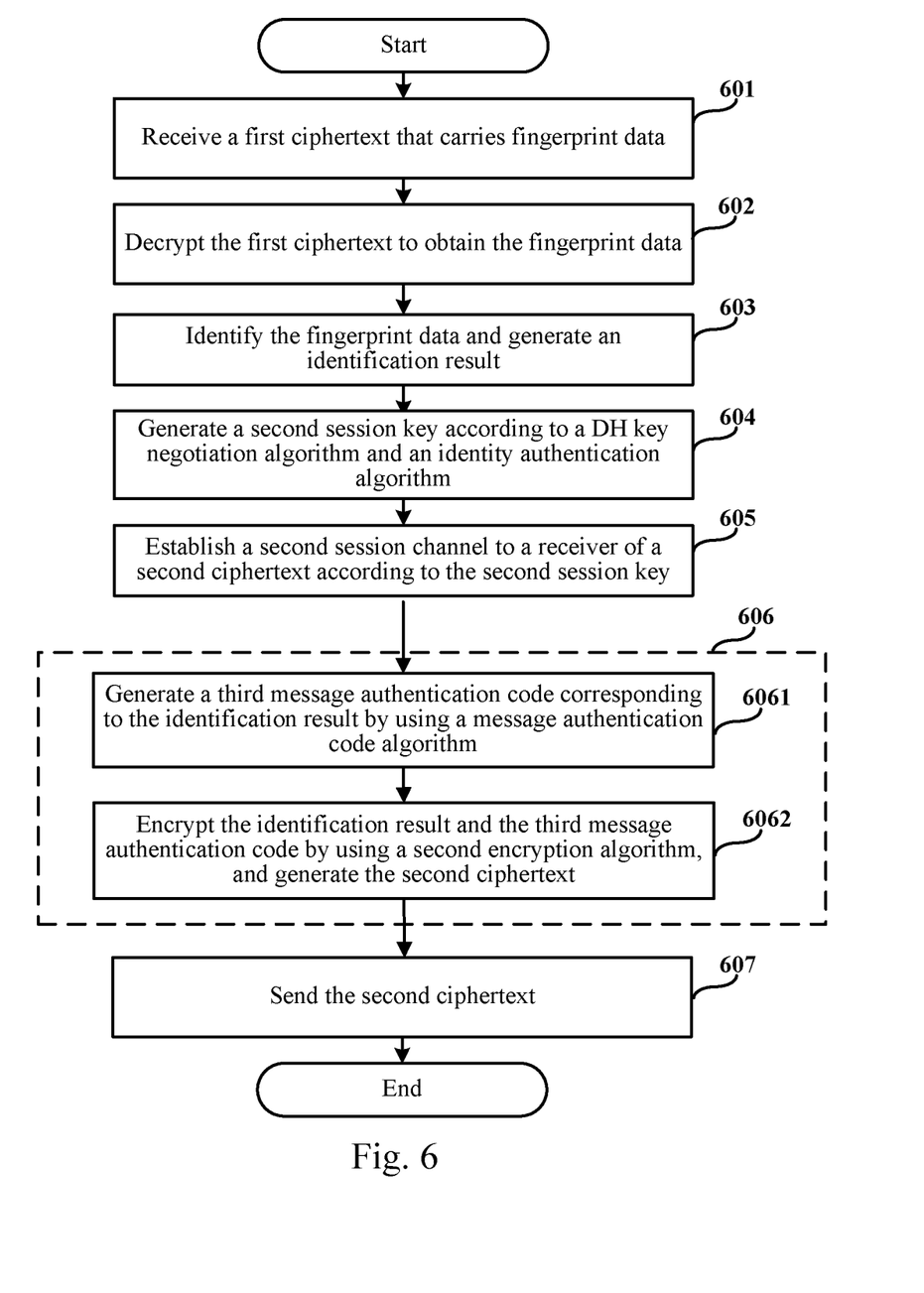
FIG. 6 is a specific flowchart of a fingerprint data processing method according to a fourth embodiment.

FIG. 6 shows the flowchart of the fingerprint data processing method in this embodiment. Steps 601 to 603 and step 607 are correspondingly the same as steps 101 to 103 and step 105 in the first embodiment. This is not described again in this embodiment, and the difference is: Steps 604 and 605 are added to this embodiment, and step 606 is detailed. Specific descriptions are as follows:

Step 604. Generate a second session key according to a diffie-hellman (DH) key negotiation algorithm and an identity authentication algorithm.

In practice, in this embodiment, the second session key is generated by using the DH key negotiation algorithm in combination with the identity authentication algorithm. The identity authentication algorithm may be, for example, an RSA or DSA signature algorithm. Although the RSA or DSA signature algorithm has a heavy calculation amount, in this embodiment, the shared key herein may be generated in real time, since a generator of the second session key runs in the host (main control chip), and the host generally has a relatively strong processing capability. This is simple and convenient.

Step 605. Establish a second session channel to a receiver of the second ciphertext according to the second session key.

In this embodiment, the receiver of the second ciphertext may be a corresponding application program, but this is not limited.

In this embodiment, the second session channel is used in transmission of the second ciphertext, that is, the second session channel is a security communications channel established for the second ciphertext.

In this embodiment, a digital signature may be used to authenticate the identity of the other sides (that is, identities of the host and the receiver of the second ciphertext), to ensure the authenticity of the identity of the other side, thereby negotiating the session key (second key) of the second session channel. Specifically, in this embodiment, in a process of generating the second key, the host and the receiver of the second ciphertext separately send data to the other side, and before the sending, both sides sign the to-be-sent data by using its own certificate information (such as a private key), and then send the data and the signature of the data together to the other side. After receiving the data, the receiver checks the data by using a signature algorithm, and delivers legal data to the key negotiation algorithm for further processing, thereby obtaining the second key and establishing the second session channel.

Step 606. Encrypt the identification result, and generate a second ciphertext that carries the identification result.

This step includes the following substeps:

Substep 6061. Generate a third message authentication code corresponding to the identification result by using a message authentication code algorithm.

In this embodiment, parameters of the message authentication code algorithm include the second session key and the identification result.

In one example, the parameters of the message authentication code algorithm further include a count value of a built-in counter. The host and the application program separately maintain a set of built-in timers for keeping synchronization. In the process of calculating the third message authentication code, a count value of a built-in counter of the host is taken to effectively resist a replay attack.

Substep 6062. Encrypt the identification result and the third message authentication code by using a second encryption algorithm, and generating the second ciphertext.

In this embodiment, the second encryption algorithm may be an AES algorithm, but this is not limited in practice. The second encryption algorithm may further be a DES algorithm or a 3DES algorithm. This embodiment does not constitute any limitation to the type of the second encryption algorithm.

In practice, this embodiment may also be a specified example based on the second or third embodiment.

Compared with the first embodiment, in this embodiment, the second session key is used to authenticate and establish the second session channel for transmission of the second ciphertext, so that the second ciphertext can be transmitted in a security communications channel, and a security protection measurement is taken for a returning process of the identification result. In addition, the message authentication code algorithm is used to generate the third message authentication code, thereby ensuring the complexity and authenticity of the identification result. Moreover, the third message authentication code and the identification result are used to generate the second ciphertext, thereby ensuring the confidentiality of the identification result.

Figure 7:
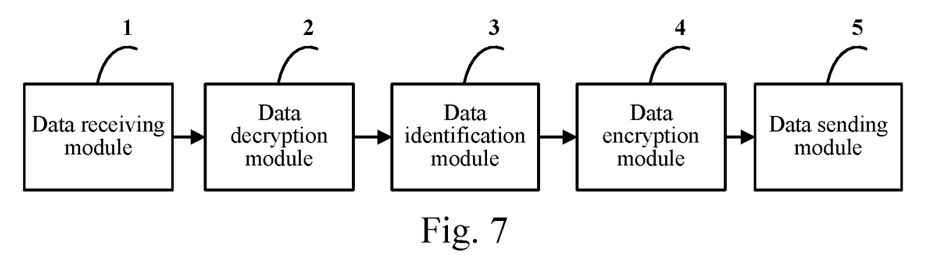
FIG. 7 is a schematic diagram of a fingerprint data processing apparatus according to a fifth embodiment.

A fifth embodiment of the present disclosure relates to a fingerprint data processing apparatus. As shown in FIG. 7, the apparatus includes:

a data receiving module 1, configured to receive a first ciphertext that carries fingerprint data;

a data decryption module 2, configured to decrypt the first ciphertext to obtain the fingerprint data;

a data identification module 3, configured to identify the fingerprint data and generate an identification result;

a data encryption module 4, configured to encrypt the identification result and generate a second ciphertext that carries the identification result; and a data sending module 5, configured to send the second ciphertext.

Compared with the existing technologies, in this embodiment, a receiver of the first ciphertext works in a TEE, so that the receiver can obtain hardware protection of the TEE, and therefore, a malicious program cannot destroy or tamper the execution environment of the receiver. In this embodiment, a first ciphertext that carries fingerprint data is received, that is, the fingerprint data is transmitted in a ciphertext form from a sender to a receiver, thereby effectively avoiding a situation in which the fingerprint data may be recorded or replayed. An identification result is encrypted, and a second ciphertext that carries the identification result is generated, that is, the first ciphertext is processed by the receiver and is encrypted at the receiver, and then leaves the receiver in a second ciphertext form, so that the identification result is transmitted in a ciphertext form from the receiver of the first ciphertext to a receiver of the second ciphertext, and security protection is performed on a returning process of the identification result, thereby effectively avoiding a situation in which the identification result may be attacked in a transmission process. In general, in this embodiment of the present disclosure, the fingerprint data obtains multi-directional security protection, thereby ensuring the confidentiality and unreplayability of the fingerprint data, and improving the security of fingerprint data.

It is not difficult to find that this embodiment is a system embodiment corresponding to the first embodiment, and this embodiment may be implemented in coordination with the first embodiment. The related technical details mentioned in the first embodiment are still effective in this embodiment.

To reduce repetition, descriptions are not provided herein again. Correspondingly, the related technical details mentioned in this embodiment may also be applied to the first embodiment.

It should be noted that, the modules involved in this embodiment are all logical modules. In actual application, one logical unit may be one physical unit, or may be a part of one physical unit, or may be implemented in a combination of multiple physical units. In addition, to highlight the creative part of the present disclosure, this embodiment does not introduce units that are not in close relationship with the technical problems for resolving the present disclosure, but it does not indicate that this embodiment does not have other units.

Figure 8:
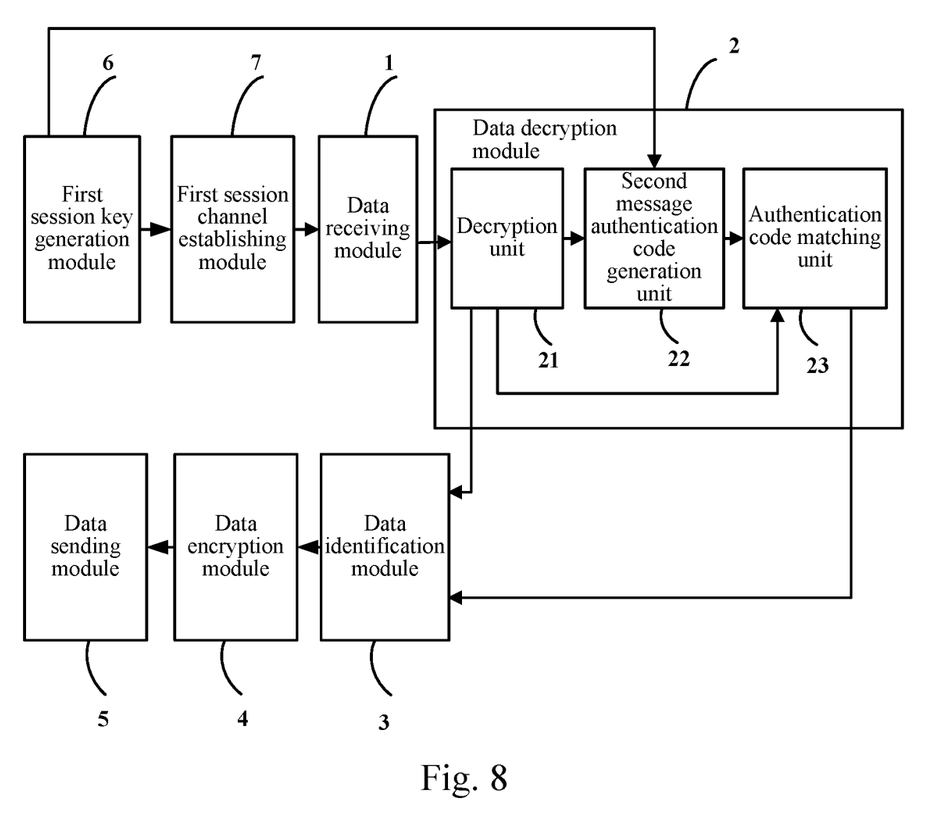
FIG. 8 is a schematic diagram of a fingerprint data processing apparatus according to a sixth embodiment.

A sixth embodiment of the present disclosure relates to a fingerprint data processing apparatus. The sixth embodiment is detailing based on the fifth embodiment, and the main detailing is: as shown in FIG. 8, in the sixth embodiment of the present disclosure, the data decryption module 2 includes a decryption unit 21, a second message authentication code generation unit 222, and an authentication code matching unit 23.

In this embodiment, the fingerprint data processing apparatus further includes a first session key generation module 6 and a first session channel establishing module 7, which are specifically as follows:

The first session key generation module 6 is configured to generate the first session key according to a preset shared key before the data receiving module 1 receives the first ciphertext that carries fingerprint data.

A preset manner of the shared key is factory presetting.

The first session channel establishing module 7 is configured to: after the first session key generation module 6 generates the first session key according to the preset shared key, establish a first session channel to a sender of the first ciphertext according to the first session key.

The first session channel is used in transmission of the first ciphertext.

In this embodiment, the data decryption module 2 includes a decryption unit 21, a second message authentication code generation unit 22, and an authentication code matching unit 23, which are specifically as follows:

The decryption unit 21 is configured to decrypt the first ciphertext by using a first decryption algorithm, to obtain the fingerprint data and a first message authentication code corresponding to the fingerprint data.

The second message authentication code generation unit 22 is configured to generate a second message authentication code corresponding to the fingerprint data by using a message authentication code algorithm.

Parameters of the message authentication code algorithm include the fingerprint data and the first session key.

In one example, the parameters of the message authentication code algorithm further include a count value of a built-in counter.

The authentication code matching unit 23 is configured to: when determining that the first message authentication code is matched with the second message authentication code, determine that the obtained fingerprint data is effective.

Compared with the fifth embodiment, in this embodiment, the security protocol is applied to the fingerprint data processing method. The first session key is generated according to the preset shared key, thereby reducing performance requirements on the sender of the first ciphertext. In this embodiment, the sender of the first ciphertext encrypts the fingerprint data, and transmits the encrypted fingerprint data to a receiver of the first ciphertext, thereby ensuring the confidentiality of the fingerprint data. The second message authentication code is generated by using the message authentication code algorithm, thereby ensuring the complexity and authenticity of the fingerprint data.

Because the second embodiment is mutually corresponding to this embodiment, this embodiment may be implemented in coordination with the second embodiment. The related technical details mentioned in the second embodiment are still effective in this embodiment. The technical effects that can be achieved in the second embodiment can also be implemented in this embodiment. To reduce repetition, descriptions are not provided herein again. Correspondingly, the related technical details mentioned in this embodiment may also be applied to the second embodiment.

Figure 9:
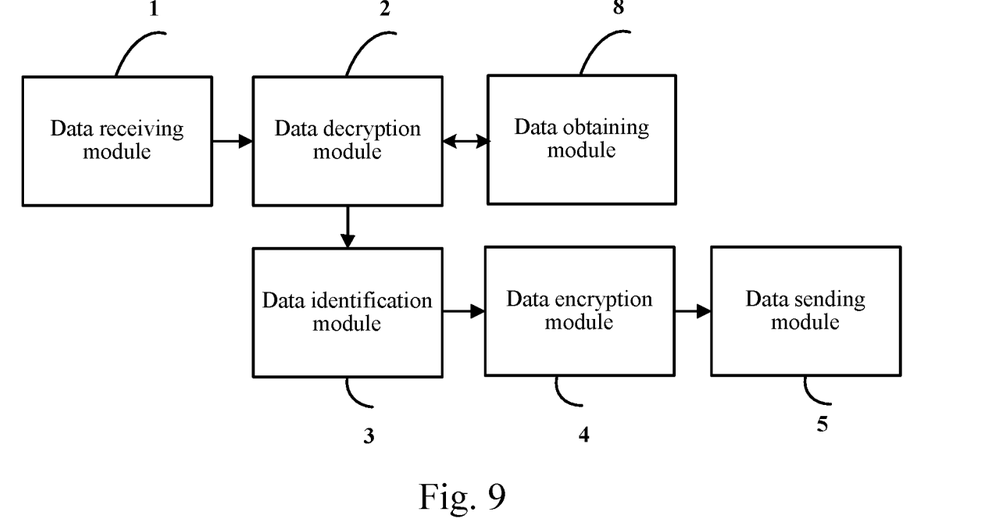
FIG. 9 is a schematic diagram of a fingerprint data processing apparatus according to a seventh embodiment.

A seventh embodiment of the present disclosure relates to a fingerprint data processing apparatus. The seventh embodiment is detailing based on the fifth embodiment, and the main detailing is: as shown in FIG. 9, in the seventh embodiment of the present disclosure, the fingerprint data processing apparatus further includes a data obtaining module 8.

The data obtaining module 8 is configured to obtain a third ciphertext that carries a fingerprint template.

The data decryption module 2 is further configured to decrypt the third ciphertext, to obtain the fingerprint template.

The data identification module 3 being configured to identify the fingerprint data and generate an identification result is specifically: the data identification module 3 being configured to perform matching identification on the fingerprint data and the fingerprint template, and generate the identification result.

In practice, this embodiment may also be a specified example based on the sixth embodiment.

Compared with the fifth embodiment, in this embodiment, the fingerprint template is stored in the preset storage area in a third ciphertext form and is transmitted to the receiver of the first ciphertext from the preset storage area in a third ciphertext form, thereby ensuring the confidentiality of the fingerprint data. Moreover, matching identification is performed on the fingerprint data and the fingerprint template to generate an identification result, and a specific manner of generating the identification result is provided.

Because the third embodiment is mutually corresponding to this embodiment, this embodiment may be implemented in coordination with the third embodiment. The related technical details mentioned in the third embodiment are still effective in this embodiment. The technical effects that can be achieved in the third embodiment can also be implemented in this embodiment. To reduce repetition, descriptions are not provided herein again. Correspondingly, the related technical details mentioned in this embodiment may also be applied to the third embodiment.

Figure 10:
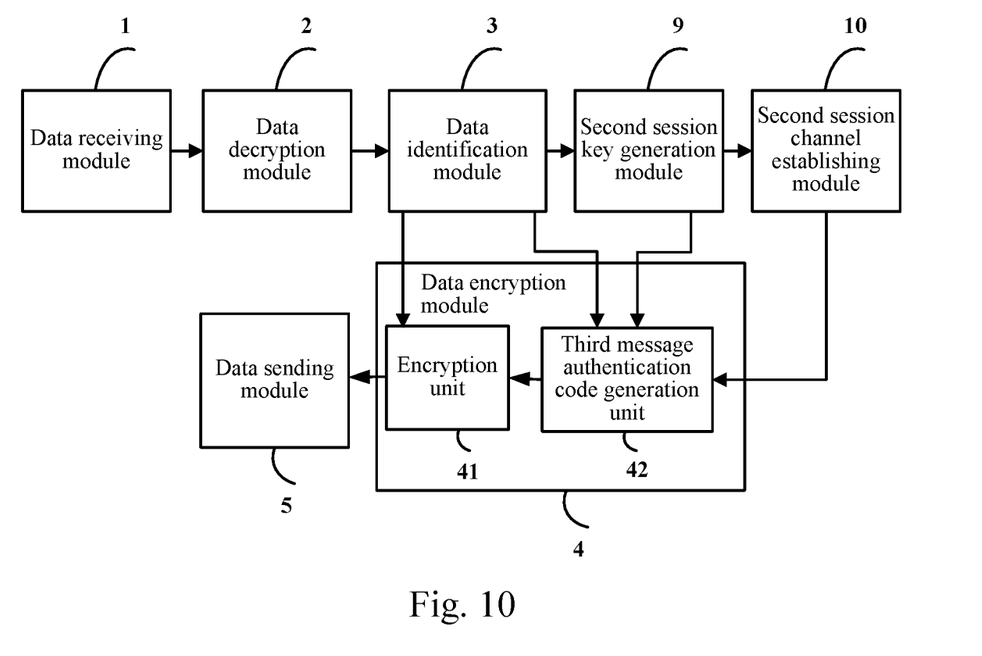
FIG. 10 is a schematic diagram of a fingerprint data processing apparatus according to an eighth embodiment.

An eighth embodiment of the present disclosure relates to a fingerprint data processing apparatus. The eighth embodiment is detailing based on the fifth embodiment, and the main detailing is: as shown in FIG. 10, in the eighth embodiment of the present disclosure, the data encryption module 4 includes an encryption unit 41 and a third message authentication code generation unit 42.

In this embodiment, the fingerprint data processing apparatus further includes a second session key generation module 9 and a second session channel establishing module 10, which are specifically as follows:

The second session key generation module 9 is configured to: before the data encryption module encrypts the identification result and generates the second ciphertext that carries the identification result, generate the second session key according to a DH key negotiation algorithm and an identity authentication algorithm.

The second session channel establishing module 10 is configured to: after the second session key generation module generates the second session key according to the DH key negotiation algorithm and the identity authentication algorithm, establish a second session channel to a receiver of the second ciphertext according to the second session key.

The second session channel is used in transmission of the second ciphertext.

The data encryption module 4 specifically includes a third message authentication code generation unit 41 and an encryption unit 42, which are specifically as follows:

The third message authentication code generation unit 41 is configured to generate a third message authentication code corresponding to the identification result by using a message authentication code algorithm.

Parameters of the message authentication code algorithm include the second session key and the identification result.

In one example, the parameters of the message authentication code algorithm further include a count value of a built-in counter.

The encryption unit 42 is configured to encrypt the identification result and the third message authentication code by using a second encryption algorithm, and generate the second ciphertext that carries the identification result.

In practice, this embodiment may also be a detailed solution based on the sixth or seventh embodiment.

Compared with the fifth embodiment, in this embodiment, the second session key is used to authenticate and establish the second session channel for transmission of the second ciphertext, so that the second ciphertext can be transmitted in a security communications channel, and a security protection measurement is taken for a returning process of the identification result. In addition, the message authentication code algorithm is used to generate the third message authentication code, thereby ensuring the complexity and authenticity of the identification result. Moreover, the third message authentication code and the identification result are used to generate the second ciphertext, thereby ensuring the confidentiality of the identification result.

Because the fourth embodiment is mutually corresponding to this embodiment, this embodiment may be implemented in coordination with the fourth embodiment. The related technical details mentioned in the fourth embodiment are still effective in this embodiment. The technical effects that can be achieved in the fourth embodiment can also be implemented in this embodiment. To reduce repetition, descriptions are not provided herein again. Correspondingly, the related technical details mentioned in this embodiment may also be applied to the fourth embodiment.

A person skilled in the art may understand that all or some steps for implementing the methods of the foregoing embodiments may be completed by instructing related hardware by using a program. The program is stored in a storage medium, and includes several instructions so that a device (which may be a single-chip microcomputer, a chip, or the like) or a processor executes all or some steps of the methods of the embodiments of this application. The foregoing storage medium includes: any medium that can store program code, such as a USB flash drive, a removable hard disk, a read-only memory (ROM), a random access memory (RAM), a magnetic disk, or an optical disc.

A person of ordinary skill in the art may understand that, the foregoing embodiments are specific embodiments for implementing the present disclosure. However, in actual application, various variations may be made in forms and details without departing from the spirit and scope of the present disclosure.

What is claimed is:

1. A fingerprint data processing method, applied to a host of an electronic device, comprising:
   receiving a first ciphertext that carries fingerprint data; wherein the first ciphertext is sent by a fingerprint sensor of the electronic device;
   decrypting the first ciphertext to obtain the fingerprint data;
   identifying the fingerprint data and generating an identification result;
   encrypting the identification result, and generating a second ciphertext that carries the identification result; and
   sending the second ciphertext to a corresponding application proxy or application program;
   wherein the decrypting the first ciphertext to obtain the fingerprint data specifically comprises:
   decrypting the first ciphertext by using a first decryption algorithm, to obtain the fingerprint data and a first message authentication code corresponding to the fingerprint data;
   generating a second message authentication code corresponding to the fingerprint data by using a message authentication code algorithm; and
   determining that the obtained fingerprint data is valid when determining that the first message authentication code is matched with the second message authentication code;
   wherein, the first ciphertext is obtained after the fingerprint data and the first message authentication code are encrypted by using a first encryption algorithm;
   the first decryption algorithm is matched with the first encryption algorithm;
   wherein, the host of the electronic device runs in a trusted execution environment.

2. The fingerprint data processing method according to claim 1, wherein parameters of the message authentication code algorithm comprise the fingerprint data and a first session key; and
   the method, before the receiving the first ciphertext that carries fingerprint data, further comprises:
   generating the first session key according to a preset shared key; and
   establishing a first session channel to a sender of the first ciphertext according to the first session key;
   wherein the first session channel is used in transmission of the first ciphertext.

3. The fingerprint data processing method according to claim 2, wherein a preset manner of the shared key is factory presetting.

4. The fingerprint data processing method according to claim 2, wherein parameters of the message authentication code algorithm further comprise a count value of a built-in counter.

5. The fingerprint data processing method according to claim 1, wherein the method, before the identifying the fingerprint data and generating the identification result, further comprises:
   obtaining a third ciphertext that carries a fingerprint template; and
   decrypting the third ciphertext to obtain the fingerprint template, wherein
   the identifying the fingerprint data and generating the identification result is specifically: performing matching identification on the fingerprint data and the fingerprint template, and generating the identification result.

6. The fingerprint data processing method according to claim 1, wherein the encrypting the identification result and generating the second ciphertext that carries the identification result specifically comprises:
   generating a message authentication code corresponding to the identification result by using a message authentication code algorithm; and
   encrypting the identification result and the message authentication code by using an encryption algorithm, and generating the second ciphertext.

7. The fingerprint data processing method according to claim 6, wherein parameters of the message authentication code algorithm comprise a session key and the identification result; and
   the method, before the encrypting the identification result and generating the second ciphertext that carries the identification result, further comprises:
   generating the session key according to a DH key negotiation algorithm and an identity authentication algorithm; and
   establishing a session channel to a receiver of the second ciphertext according to the-session key;
   wherein the session channel is used in transmission of the second ciphertext.

8. A fingerprint data processing apparatus, included in an electronic device, comprising: a processor and a memory in communicative connection with the processor, wherein, the memory stores an instruction executable by the processor, and the instruction is executed by the processor to cause the processor to perform a fingerprint data processing method, wherein the fingerprint data processing method comprises:
   receiving a first ciphertext that carries fingerprint data; wherein, the first ciphertext is sent by a fingerprint sensor of the electronic device;
   decrypting the first ciphertext to obtain the fingerprint data;
   identifying the fingerprint data and generating an identification result;
   encrypting the identification result, and generating a second ciphertext that carries the identification result; and
   sending the second ciphertext to a corresponding application proxy or application program;
   wherein the decrypting the first ciphertext to obtain the fingerprint data specifically comprises:
   decrypting the first ciphertext by using a first decryption algorithm, to obtain the fingerprint data and a first message authentication code corresponding to the fingerprint data;
   generating a second message authentication code corresponding to the fingerprint data by using a message authentication code algorithm; and
   determining that the obtained fingerprint data is valid when it is determined that the first message authentication code is matched with the second message authentication code;
   wherein, the fingerprint data and the first message authentication code are encrypted by using a first encryption algorithm, to obtain the first ciphertext;
   the first decryption algorithm is matched with the first encryption algorithm;
   wherein the host of the electronic device runs in a trusted execution environment.

9. The fingerprint data processing apparatus according to claim 8, wherein parameters of the message authentication code algorithm comprise the fingerprint data and a first session key; and,
   the method, before the receiving the first ciphertext that carries fingerprint data, further comprises:
   generating the first session key according to a preset shared key; and
   establishing a first session channel to a sender of the first ciphertext according to the first session key;
   wherein the first session channel is used in transmission of the first ciphertext.

10. The fingerprint data processing apparatus according to claim 9, wherein a preset manner of the shared key is factory presetting.

11. The fingerprint data processing apparatus according to claim 9, wherein the method, before the identifying the fingerprint data and generating the identification result, further comprises;
   obtaining a third ciphertext that carries a fingerprint template; and
   decrypting the third ciphertext to obtain the fingerprint template; wherein the identifying the fingerprint data and generating the identification result is specifically:
   performing matching identification on the fingerprint data and the fingerprint template and generating the identification result.

12. The fingerprint data processing apparatus according to claim 9, wherein the encrypting the identification result and generating the second ciphertext that carries the identification result specifically comprises:
   generating a message authentication code corresponding to the identification result by using a message authentication code algorithm; and
   encrypting the identification result and the message authentication code by using an encryption algorithm, and generating the second ciphertext that carries the identification result.

13. The fingerprint data processing apparatus according to claim 12, wherein parameters of the message authentication code algorithm comprise a session key and the identification result; and
   the method, before the encrypting the identification result and generating the second ciphertext that carries the identification result, further comprises:
   generating the session key according to a DH key negotiation algorithm and an identity authentication algorithm; and
   establishing a session channel to a receiver of the second ciphertext according to the session key;
   wherein the session channel is used in transmission of the second ciphertext.

14. The fingerprint data processing apparatus according to claim 9, wherein parameters of the message authentication code algorithm further comprise a count value of a built-in counter.

* * * * *